United States Patent [19]

Knothe et al.

[11] 4,261,430
[45] Apr. 14, 1981

[54] WEIGHPAN WITH THREE POINT SUPPORT ON TWO LEVERS

[75] Inventors: Erich Knothe, Bovenden; Christoph Berg, Adelebsen; Franz J. Melcher, Hardegsen; Dieter Blawert, Goettingen, all of Fed. Rep. of Germany

[73] Assignee: Sartorius GmbH, Göttingen, Fed. Rep. of Germany

[21] Appl. No.: 100,035

[22] Filed: Dec. 4, 1979

[30] Foreign Application Priority Data

Dec. 8, 1978 [DE] Fed. Rep. of Germany ....... 2853074

[51] Int. Cl.³ .................. G01G 7/00; G01G 21/08
[52] U.S. Cl. ................................ 177/212; 177/256

[58] Field of Search ................... 177/256–259, 177/255, 212

[56] References Cited

U.S. PATENT DOCUMENTS 3,835,946  9/1974  Mettler ........................ 177/256

Primary Examiner—George H. Miller, Jr.
Attorney, Agent, or Firm—Otto John Munz

[57] ABSTRACT

A flat weighbridge has a load platform supported by either two one-armed or two two-armed levers arranged at least partly beneath the load platform, wherein one lever is bifurcated to define two spread apart sides and each of the sides bears a supporting device for the load platform, while the other lever bears only one supporting device for the load platform.

5 Claims, 4 Drawing Figures

WEIGHPAN WITH THREE POINT SUPPORT ON TWO LEVERS

BACKGROUND OF THE INVENTION

1. Field of the Invention

The invention relates to a flat weighbridge with a load platform supported via supporting devices by two one-armed or two two-armed levers arranged at least partly beneath the load platform.

2. Prior Art

The levers of such weighers are mostly unilaterally spread apart in a fork-like manner and are connected each at two places, via joints, with the casing. Likewise, the load platform is supported by each lever at two places in each case via flexible intermediate elements. Depending on construction requirements, both levers are one-armed or both are two-armed. A bridge construction of this type is well adapted to the generally rectangular form of load platform, but it presents the disadvantage that, due to the support of the load platform at four places, the position thereof is statically over-determined. Besides, the corner load adjustment must be carried out separately for all four corners, which requires at least three places of adjustment.

SUMMARY OF THE INVENTION

It is therefore the purpose of the invention to improve a flat weighbridge of the type initially described in such a way that the aforementioned disadvantages are eliminated, and that particularly a simplified adjustment against corner load errors is possible.

According to the invention, this is accomplished by a structure wherein only one lever is unilaterally spread apart in a fork-like manner and bears at both spread-apart sides a supporting device for the load platform, while the other lever is not spread apart and bears only one supporting device for the load platform.

By this construction of the two levers, the number of supports for the load platform is reduced to three support places, so that an over-determination no longer exists. The corner load adjustment has to be carried out at two adjustment places only. Furthermore, the number of necessary joints is decreased.

The shape of the load platform may be rectangular, but in adaptation to the three support places it is suitably circular or trapezoidal.

Spring joints are provided as flexible joints between the levers and the casing, and between the levers and the load platform.

BRIEF DESCRIPTION OF THE DRAWINGS

The invention is explained in the following with the aid of the drawings, showing two embodiments, in which.

DETAILED DESCRIPTION OF THE PREFERRED EMBODIMENTS

Figure 1:
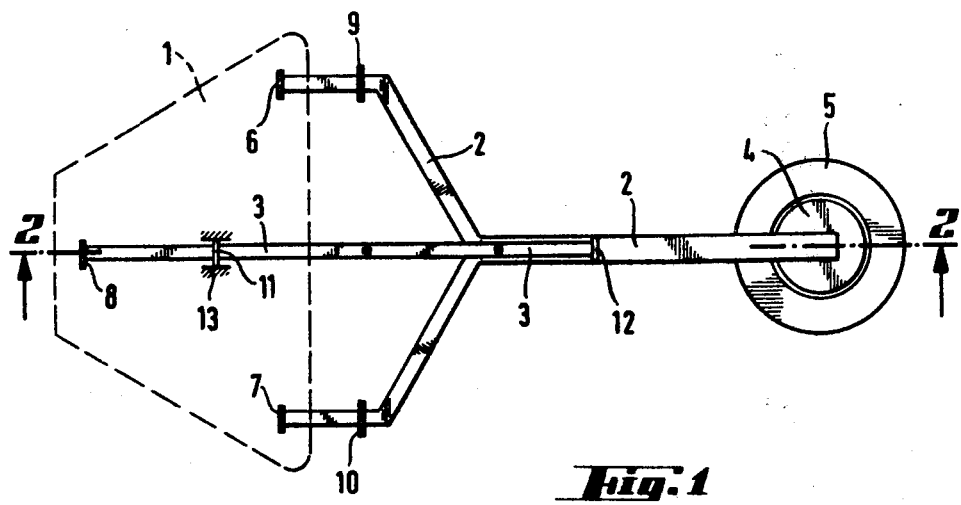
FIG. 1 is a diagrammatic plan view of a lever arrangement, taken along line I—I in FIG. 2.
Figure 2:
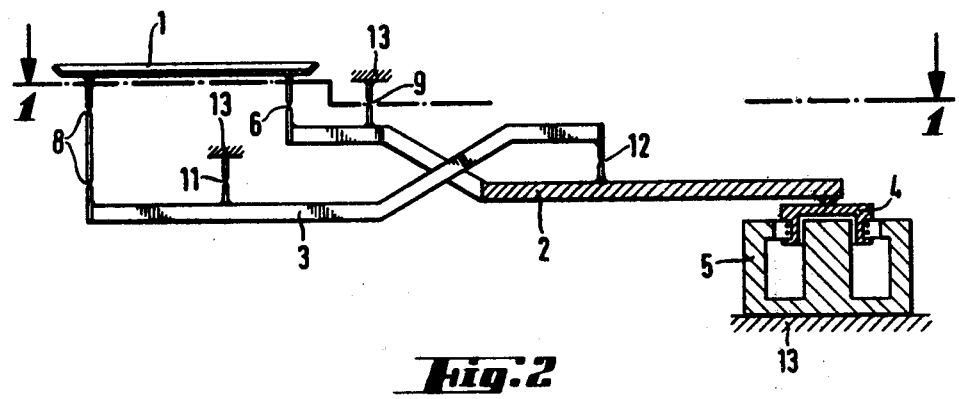
FIG. 2 is a sectional view in side elevation taken along line II—II in FIG. 1, of the lever arrangement of FIG. 1.

In the first embodiment shown in FIGS. 1 and 2, the trapezoidal load platform 1 shown in dash lines is supported on one side via two spring joints 6 and 7 by a first two-armed lever 2. Lever 2 is unilaterally spread apart in a fork-like manner and supported with two spring joints 9 and 10 at fixed points 13 of the casing, now shown. At its end, lever 2 supports a compensating coil 4 which, together with a stationary permanent magnet 5 produces a counterforce proportional to the load in a known and therefore here not shown and explained manner. The load platform 1 is supported on the other side via a spring joint 8 by a second two-armed lever 3, which is not spread apart and is supported with a spring joint 11 serving as an axis of rotation, at fixed points 13 of the casing. Lever 3 is connected at its other end via a spring element 12 with lever 2.

The adjustment of the corner load takes place in such a way that, in the first place, the two lever arms which are established by the distances between the spring elements 6 and 9, and 7 and 10, are adjusted to the same length, and that in the second place, the lever ratio between the two levers 2 and 3 up to the connecting spring element 12 is set so as to be the same, i.e., the distance between the two spring elements 8 and 11 in proportion to the distance between the two spring elements 11 and 12 is adjusted so as to equal the distance between the two spring elements 6 and 9, and 7 and 10, in proportion to the distance between the two spring elements 9 and 12, and 10 and 12.

Figure 3:
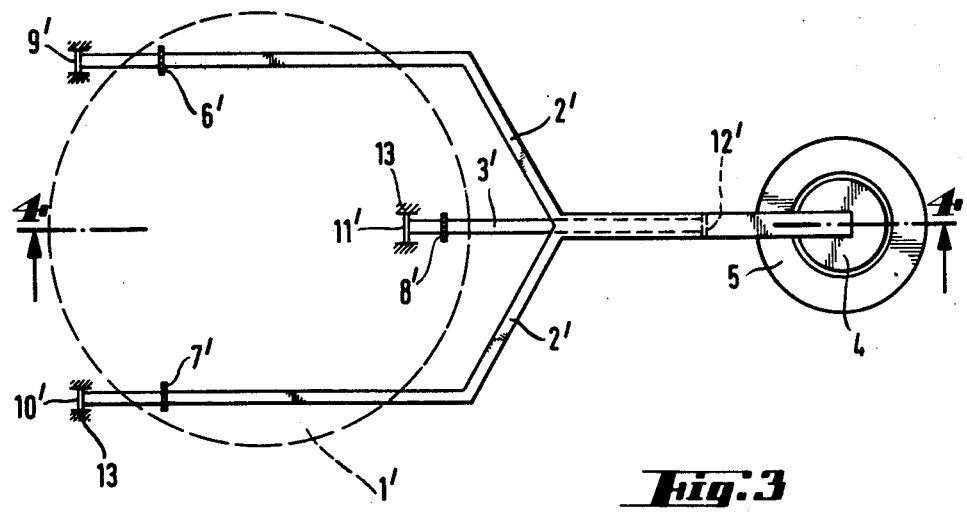
FIG. 3 is a diagrammatic plan view of another lever arrangement, taken along line III—III in FIG. 4.
Figure 4:
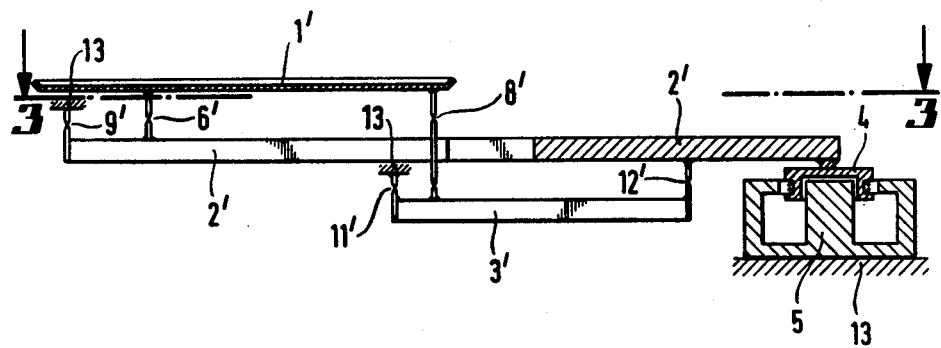
FIG. 4 is a sectional view in side elevation, taken along line IV—IV in FIG. 3, showing the lever arrangement of FIG. 3.

The embodiment shown in FIGS. 3 and 4 consists of a one-armed lever 2 spread apart in a fork-like manner, and a one-armed lever 3' not spread apart. The load platform 1' is circular and is supportd via three spring joints 6', 7' and 8', by the two levers 2' and 3'. The partial force absorbed by lever 3' is in turn transferred via a spring element 12' to lever 2', at whose end coil 4 together with a permanent magnet 5 produces the counterforce proportional to the load. The corner load adjustment takes place analogously to that of the embodiment of FIGS. 1 and 2.

Of course, the various elements of the embodiments described can be combined in another manner, thus, for example, a long fork-shaped spread-apart lever and a short not-spread-apart lever, as in FIGS. 3 and 4, combined with a two-armed suspension of the levers as in FIGS. 1 and 2.

We claim:

1. A flat weighbridge with a load platform, comprising:
    supporting devices supporting said load platform; two one-armed levers arranged at least partly beneath the load platform; only one lever being spread apart unilaterally in a fork-like manner and bearing at each of the two spread-apart sides one of the supporting devices for the load platform;
    said other lever bearing only one of the supporting devices for the load platform.

2. A weighbridge as claimed in claim 1; said load platform having a circular shape.

3. A weighbridge as claimed in claim 1; the load platform having a trapezoidal shape.

4. A weighbridge as claimed in claim 1; spring joints being employed as flexible joints between the levers and the casing, and between the levers and the load platform.

5. A weighbridge, comprising:

a first lever bifurcated at one end;

a magnet unit with an air gap;

a compensating coil;

said bifurcated lever connected at its other end to said compensating coil;

said first lever having load platform support means at each side of the bifurcated end, and being supported between its ends to a fixed support;

a second lever having only one load platform support at one of its ends, and being connected at its other end to the first lever;

said second lever being supported between its ends to a fixed support; and said compensating coil being disposed in the air gap of said magnet unit.

* * * * *